(12) United States Patent
Cornille et al.

(10) Patent No.: US 10,689,780 B2
(45) Date of Patent: *Jun. 23, 2020

(54) HIGH MODULUS TEXTILE CORD WITH AN AT LEAST TRIPLE TWIST

(71) Applicants: COMPAGNIE GENERALE DES ESTABLISSEMENTS MICHELIN, Clermont-Ferrand (FR); Michelin Recherche et Technique S.A., Granges-Paccot (CH)

(72) Inventors: Richard Cornille, Clermont-Ferrand (FR); Jeremy Guillaumain, Clermont-Ferrand (FR); Christophe Le Clerc, Clermont-Ferrand (FR); Augustin Bosquet, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 150 days.

This patent is subject to a terminal disclaimer.

(21) Appl. No.: 15/532,808

(22) PCT Filed: Dec. 7, 2015

(86) PCT No.: PCT/EP2015/078841
§ 371 (c)(1),
(2) Date: Jun. 2, 2017

(87) PCT Pub. No.: WO2016/091812
PCT Pub. Date: Jun. 16, 2016

(65) Prior Publication Data
US 2017/0327978 A1 Nov. 16, 2017

(30) Foreign Application Priority Data
Dec. 9, 2014 (FR) ...................................... 14 62105

(51) Int. Cl.
*D02G 3/48* (2006.01)
*B60C 9/00* (2006.01)
(Continued)

(52) U.S. Cl.
CPC ............. *D02G 3/48* (2013.01); *B60C 9/0042* (2013.01); *D02G 3/28* (2013.01); *D07B 1/025* (2013.01);
(Continued)

(58) Field of Classification Search
CPC . D02G 3/48; D07B 1/02; D07B 1/025; D07B 1/0606; D07B 1/06; D07B 1/0626;
(Continued)

(56) References Cited

U.S. PATENT DOCUMENTS 1,632,201 A * 6/1927 Steere .................. B60C 9/0042
139/426 R
1,708,668 A * 4/1929 Evans .................. B60C 9/0042
152/556
(Continued)

FOREIGN PATENT DOCUMENTS

EP 0021485 A1 1/1981
EP 00220642 A1 5/1987
(Continued)

OTHER PUBLICATIONS

Dupont, Kevlar Technical Information, Rev. 2/01, p. 5, http://www.dupont.co.uk/content/dam/dupont/products-and-services/fabrics-fibers-and-nonwovens/fibers/documents/Technical%20Guide%20for%20Kevlar%C2%AE%20in%20Mechanical%20Rubber%20Goods.pdf, last visited Feb. 4, 2019.*
(Continued)

*Primary Examiner* — Shaun R Hurley
*Assistant Examiner* — Patrick J. Lynch
(74) *Attorney, Agent, or Firm* — Venable LLP (57) ABSTRACT

A high modulus textile cord (50) with at least triple twist (T1, T2, T3) comprises at least N strands (20a, 20b, 20c,

20*d*), N being greater than 1, twisted together with a final twist T3 and a final direction D2, each strand being made up of M pre-strands (10*a*, 10*b*, 10*c*), M being greater than 1, themselves twisted together with an intermediate twist T2 (T2a, T2b, T2c, T2d) and an intermediate direction D1 opposite to D2, each pre-strand itself consisting of a yarn (5) which has been twisted on itself beforehand with an initial twist T1 (T1a, T1b, T1c) and the direction D1, in which at least half of the N times M yarns have an initial elastic modulus denoted Mi which is greater than 2000 cN/tex. This textile cord can advantageously be used as a reinforcer in tires for vehicles, particularly in the belt or carcass reinforcement of these tires.

29 Claims, 5 Drawing Sheets

(51) Int. Cl.
*D02G 3/28* (2006.01)
*D07B 1/02* (2006.01)

(52) U.S. Cl.
CPC .............. *B60C 2009/0078* (2013.01); *B60C 2009/0092* (2013.01); *D07B 2201/1016* (2013.01); *D07B 2201/1044* (2013.01); *D07B 2201/1064* (2013.01); *D07B 2201/2009* (2013.01); *D07B 2201/2025* (2013.01); *D07B 2201/2036* (2013.01); *D07B 2205/205* (2013.01); *D07B 2205/2046* (2013.01); *D07B 2501/2046* (2013.01)

(58) Field of Classification Search
CPC .. D07B 1/613; D07B 1/62; D07B 2201/1044; D07B 2201/1064; D07B 2201/2025; D07B 2201/2005; D07B 2201/2046; D07B 2201/104
USPC .......................................................... 57/237
See application file for complete search history.

(56) References Cited

U.S. PATENT DOCUMENTS

| | | | |
|---|---|---|---|
| 2,116,937 A * | 5/1938 | Veesey | D02G 3/26 112/136 |
| 2,132,492 A * | 10/1938 | Parker | B60C 9/0042 152/451 |
| 2,485,153 A * | 10/1949 | Henning | D07B 5/06 57/237 |
| 3,287,323 A * | 11/1966 | Kwolek | C08G 69/26 528/336 |
| 3,419,060 A | 12/1968 | Goy | |
| 3,607,499 A * | 9/1971 | Garbin | B29D 29/10 156/137 |
| 3,977,172 A | 8/1976 | Kerawalla | |
| 4,155,394 A | 5/1979 | Shepherd et al. | |
| 4,368,615 A | 1/1983 | Lammers | |
| 4,790,802 A * | 12/1988 | Onoe | F16G 1/08 474/260 |
| 4,807,680 A * | 2/1989 | Weidenhaupt | D02G 3/48 152/451 |
| 4,877,073 A * | 10/1989 | Thise | B60C 9/0042 152/451 |
| 4,926,920 A | 5/1990 | Gouttebessis | |
| 5,558,144 A | 9/1996 | Nakayasu et al. | |
| 6,093,490 A | 7/2000 | Meraldi et al. | |
| 6,132,328 A * | 10/2000 | Kinoshita | D02G 3/28 474/260 |
| 6,261,689 B1 | 7/2001 | Meraldi et al. | |
| 8,012,056 B2 * | 9/2011 | Di Meco | D02G 3/447 474/263 |
| 8,403,014 B2 | 3/2013 | Fukumoto | 152/548 |
| 2006/0213174 A1 * | 9/2006 | Wu | F16G 1/28 57/237 |
| 2006/0213175 A1 * | 9/2006 | Smith | B66B 7/06 57/237 |
| 2010/0064654 A1 * | 3/2010 | Nuesch | D07B 1/005 57/237 |
| 2010/0224302 A1 | 9/2010 | Fukumoto | 152/556 |
| 2013/0025758 A1 * | 1/2013 | Kim | B60C 9/005 152/451 |
| 2013/0240105 A1 * | 9/2013 | Zmolek | B29D 30/38 152/526 |
| 2014/0051312 A1 | 2/2014 | Abad et al. | |
| 2014/0069563 A1 * | 3/2014 | Le Clerc | D02G 3/48 152/527 |
| 2015/0239301 A1 | 8/2015 | Vallet et al. | |
| 2017/0327976 A1 | 11/2017 | Cornille et al. | |
| 2017/0327977 A1 | 11/2017 | Cornille et al. | |

FOREIGN PATENT DOCUMENTS

| | | |
|---|---|---|
| EP | 0225391 A1 | 6/1987 |
| EP | 0335588 A2 | 10/1989 |
| EP | 0467585 A1 | 1/1992 |
| EP | 0848767 A1 | 6/1998 |
| EP | 2 186 652 A1 | 5/2010 |
| JP | 7-144731 A | 6/1995 |
| JP | 10-291618 A | 11/1998 |
| JP | 2000-320616 A | 11/2000 |
| WO | 97/06294 A1 | 2/1997 |
| WO | 2012/104279 A1 | 8/2012 |
| WO | 2012/146612 A1 | 11/2012 |
| WO | 2014/057082 A1 | 4/2014 |

OTHER PUBLICATIONS

International Search Report dated Feb. 4, 2016, issued by EPO in connection with International Application No. PCT/EP2015/078841.

\* cited by examiner

HIGH MODULUS TEXTILE CORD WITH AN AT LEAST TRIPLE TWIST

1. FIELD OF THE INVENTION

The present invention relates to the textile reinforcing elements or "reinforcers" that can be used to reinforce items made of plastic or items made of rubber such as vehicle tyres.

It relates more particularly to textile cords or plied yarns that can be used notably for reinforcing such tyres.

2. STATE OF THE ART

Textiles have been used as reinforcers ever since tyres first appeared.

Textile cords, manufactured from continuous textile fibres such as polyester, nylon, cellulose or aramid fibres, are known to play an important part in tyres, even in high-performance tyres which have been homologated for running at very high speeds. In order to meet the requirements of the tyres, they need to have a high breaking strength, a high elastic modulus, good fatigue endurance and, finally, good adhesion to the rubber or other polymer matrices that they are liable to reinforce.

It will simply be recalled here that these textile plied yarns or cords, traditionally of the double twist (T1, T2) type, are prepared by a method known as a twisting method, in which:
  during a first step, each multifilament fibre or yarn that makes up the final cord is first of all twisted individually on itself (with an initial twist T1) in a given direction D1 (respectively the S direction or the Z direction) to form a strand in which the elementary filaments are deformed in a helix about the axis of the fibre (or axis of the strand);
  then, during a second step, several strands, generally two, three or four, which are identical in nature or different in the case of cords said to be hybrid or composite, are then twisted together with a final twist T2 (which may be the same as or different from T1) in the opposite direction D2 (respectively in the Z direction or the S direction, according to a recognized naming convention denoting the orientation of the turns according to the cross bar of an S or of a Z) to obtain a cord or final assembly comprising several strands.

The purpose of the twisting is to adapt the properties of the material in order to create the transverse cohesion of the reinforcer, increase its fatigue strength and also improve adhesion with the matrix reinforced.

Such textile cords, their constructions and methods of manufacture are well known to those skilled in the art. They have been described in detail in a great many documents, for example in patent documents EP 021 485, EP 220 642, EP 225 391, EP 335 588, EP 467 585, U.S. Pat. Nos. 3,419,060, 3,977,172, 4,155,394, 5,558,144, WO97/06294 or EP 848 767, or more recently WO2012/104279, WO2012/146612, WO2014/057082, to name but a few.

In order to be able to reinforce rubber items such as tyres, the fatigue strength (tensile, bending, compression endurance) of these textile cords is of key importance. It is known that, in general, for a given material, the greater the twist applied, the higher this fatigue strength is, but that the counterpart to this is that the tensile breaking force (referred to as tenacity when expressed per unit weight) of said textile cords decreases inexorably as the twist increases, something which of course is penalizing from the reinforcing viewpoint.

So, designers of textile cords, like tyre manufacturers, are constantly looking for textile cords of which the mechanical properties, particularly breaking force and tenacity, for a given material and a given twist, can be improved.

3. BRIEF DESCRIPTION OF THE INVENTION

Now, in the course of their research, the applicant companies have specifically found a novel textile cord of high modulus type the specific architecture and construction of which unexpectedly, for a given final twist, make it possible to improve not only the rupture force and tenacity properties but also the compression or bending-compression endurance properties.

Thus, according to a first subject, the present invention relates to a textile cord with at least triple twist (T1, T2, T3) comprising at least N strands, N being greater than 1, twisted together with a twist T3 and a direction D2, each strand being made up of M pre-strands, M being greater than 1, themselves twisted together with a twist T2 and a direction D1 opposite to D2, each pre-strand itself consisting of a yarn which has been twisted on itself beforehand with a twist T1 and the direction D1, in which at least half of the N times M yarns have an initial elastic modulus denoted Mi which is greater than 2000 cN/tex.

The invention also relates to the use of such a textile cord as a reinforcing element for items or semi-finished products made of plastic or of rubber such as pipes, belts, conveyor belts, vehicle tyres, and to these items and semi-finished products made of rubber and tyres themselves, both in the raw state (namely before curing or vulcanizing) and in the cured state (after curing).

The tyres of the invention, in particular, may be intended for motor vehicles of the passenger car, 4×4 or SUV (Sport Utility Vehicle) type, but may also be intended for two-wheeled vehicles such as motor bikes, or for industrial vehicles chosen from vans, heavy-duty vehicles i.e. metro trains, busses, road haulage vehicles (lorries, tractors, trailers) and off-road vehicles—agricultural or civil engineering equipment, aircraft, other transport or handling vehicles.

The textile cord of the invention is quite particularly intended to be used in crown reinforcements (or belts) or in carcass reinforcements of tyres for the vehicles described hereinabove.

BRIEF DESCRIPTION OF THE FIGURES

The invention and the advantages thereof will be readily appreciated in the light of the detailed description and of the exemplary embodiments which follow, and of FIGS. 1 to 7 which relate to these embodiments and which (unless indicated otherwise without being drawn to a specific scale) depict:
  in cross section, a conventional multifilament textile fibre (or yarn) first of all in the initial state (5), namely without any twist, and then after a first twisting operation T1 in the direction D1 for formation of a yarn twisted on itself or "pre-strand" (10) (FIG. 1);
  in cross section, the assembly of 3 yarns (10a, 10b, 10c) as hereinabove, acting as pre-strands (twisted beforehand with T1a, T1b, T1c in the same direction D1) which are assembled by a second operation of twisting T2 still in the same direction D1, for formation of a strand (20) intended for the cord according to the invention (FIG. 2);
  in cross section, the assembly of 3 strands (20a, 20b, 20c) as hereinabove (twisted beforehand with T2a, T2b, T2c in the same direction D1) which are assembled by a third operation of twisting T3 this time in the direction D2 opposite to the direction D1, for formation of a final textile cord (30) with triple twist (T1, T2, T3) according to the invention (FIG. 3);

in cross section, the conventional assembly of 3 yarns (10a, 10b, 10c) as hereinabove this time acting directly as strands (all twisted beforehand with T1a, T1b, T1c in the direction D1) which are assembled by a second operation of twisting T2 in the direction D2 which is opposite to the direction D1, for formation of a textile cord according to the prior art (40) with double twist (T1, T2) (FIG. 4);

in cross section, the assembly of 4 strands (20a, 20b, 20c, 20d) (twisted beforehand with T2a, T2b, T2c, T2d in the same direction D1) which are assembled by a third operation of twisting T3 in the direction D2 which is the opposite to the direction D1, for formation of a final textile cord (50) with triple twist (T1, T2, T3) according to the invention (FIG. 5);

in cross section, another depiction, less schematic than the preceding one, of the above cord (50), illustrating the fact that the final cross section of a textile cord (incidentally whether or not it is a cord in accordance with the invention) once formed and under minimal tension, is in fact more closely similar to a cross section of circular outline, because of the high degree of lateral plasticity afforded by the multifilamentary nature of the starting material (FIG. 6);

finally, in radial section (which means to say in a plane containing the axis of rotation of the tyre), an example of a tyre according to the invention, incorporating a textile cord according to the invention (FIG. 7).

4. DETAILED DESCRIPTION OF THE INVENTION

In the present application, unless expressly indicated otherwise, all the percentages (%) indicated are mass percentages.

Any interval of values denoted by the expression "between a and b" represents the range of values extending from more than a to less than b (namely end points a and b excluded) whereas any interval of values denoted by the expression "from a to b" means the range of values extending from a up to b (namely including the strict end points a and b).

The high modulus textile cord or plied yarn according to the invention is therefore (with reference to the appended FIGS. 1 to 3 and 5) a textile cord (30, 50) of highly specific construction, which has the essential features of comprising:

at least a triple (which means to say three or more than three) twist (T1, T2, T3);

at least N strands (20, 20a, 20b, 20c, 20d), N being greater than 1, which are twisted together with a final twist T3 and a same final direction D2;

each strand being made up of M pre-strands (10, 10a, 10b, 10c), M being greater than 1, themselves twisted together with an intermediate twist T2 (T2a, T2b, T2c, T2d) and an intermediate direction D1 the opposite of D2;

each pre-strand consisting of a yarn (5) which has been twisted on itself beforehand with an initial twist T1 (T1a, T1b, T1c) and the initial direction D1.

A person skilled in the art will immediately understand from the expression cord having at least a triple twist (which means to say having three twists or more) that at least three consecutive operations of untwisting (or of twisting in the opposite direction) are therefore needed in order to "deconstruct" the cord of the invention and "get back" to the initial yarns of which it is made, namely to rediscover the starting yarns (multifilament fibres) in their initial state, namely free of twist. Stated otherwise, there are at least three (three or more) successive twisting operations to form the cord of the invention, rather than two as is usually the case.

Another essential feature is that at least half of the yarns that make up the cord have an initial elastic modulus denoted Mi which is greater than 2000 cN/tex.

The structure of the textile cord of the invention and the steps involved in manufacturing it will now be described in detail.

Figure 1:
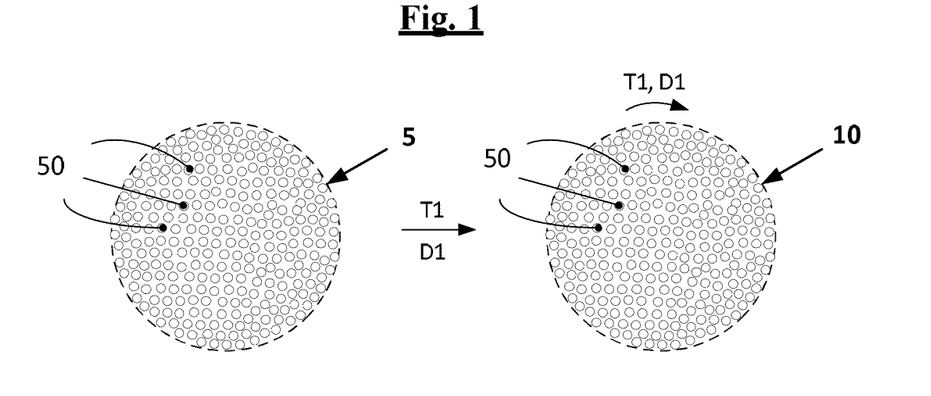

First of all, FIG. 1 schematically depicts in cross section a conventional multifilament textile fibre (5) also known as a "yarn", in the initial state, namely free of twist; as is well known, such a yarn is formed form a plurality of elementary filaments (50), typically several tens to several hundreds, of very fine diameter generally less than 25 μm.

After an operation of twisting T1 (first twist) in a direction D1 (S or Z), the initial yarn (5) is converted into a yarn twisted on itself and known as a "pre-strand" (10). In this pre-strand, the elementary filaments thus find themselves deformed in a helix about the axis of the fibre (or the axis of the pre-strand).

Figure 2:
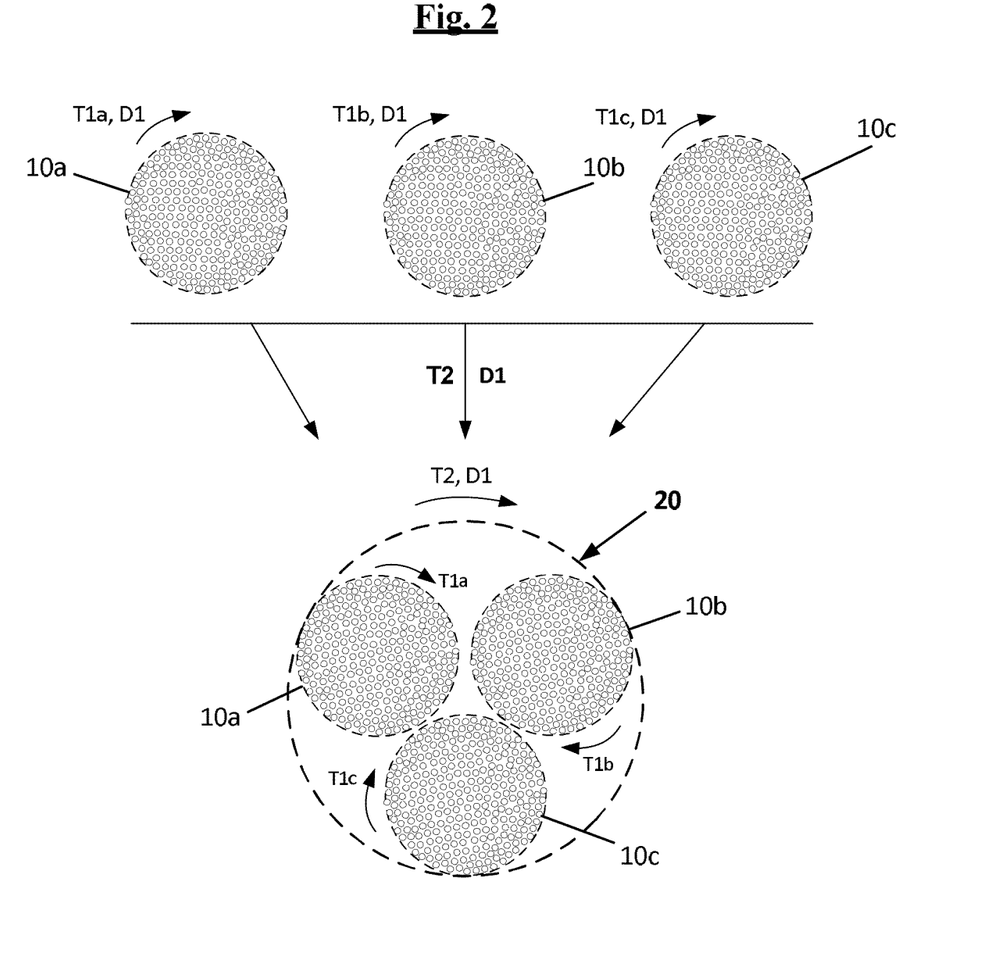

Next, as illustrated by way of example in FIG. 2, M pre-strands (for example here three of them; 10a, 10b, 10c) are then themselves twisted together, in the same direction D1 as before, with an intermediate twist T2 (second twist) to form a "strand" (20). Each pre-strand is characterized by a specific first twist T1 (for example here, T1a, T1b, T1c) which may be equal (in the general case, namely that here for example, T1a=T1b=T1c) or different from one pre-strand to another.

Figure 3:
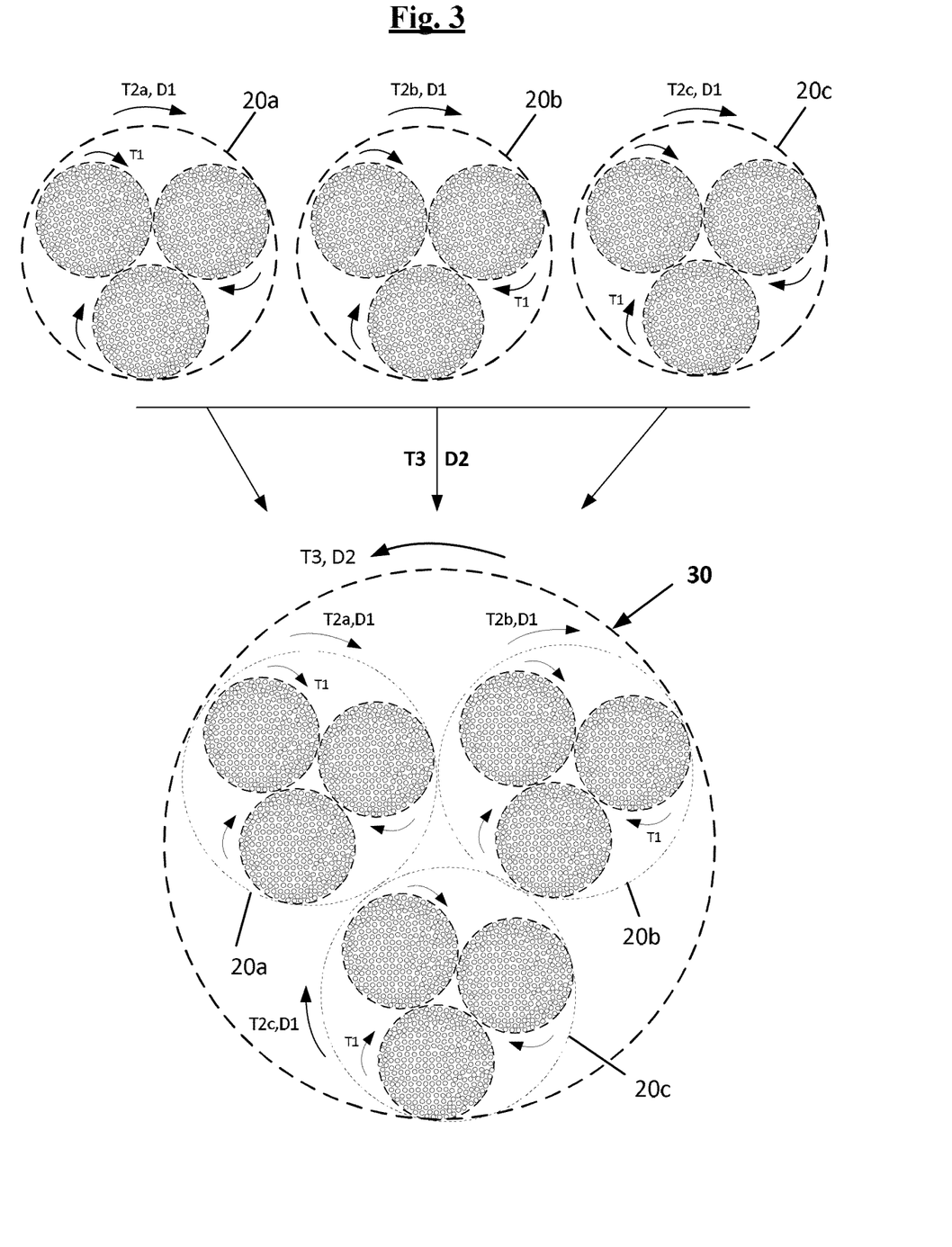

Finally, as schematically indicated in FIG. 3, N strands (for example here three strands; 20a, 20b, 20c) are then themselves twisted together in the direction D2 which is opposite to D1, with a final twist T3 (third twist) to form the final textile cord (30) according to the invention. Each strand is characterized by a specific second twist T2 (for example here T2a, T2b, T2c) which may be the same (in the general case, namely here for example T2a=T2b=T2c) or different from one strand to another.

The final textile cord (30) thus obtained, comprising N times M (here, for example, nine) pre-strand, is therefore characterized by (at least) a triple twist (T1, T2, T3).

The invention of course applies to instances in which more than three successive twists, for example four (T1, T2, T3, T4) or five (T1, T2, T3, T4, T5), are applied to the starting yarns (5). However, the invention is preferably implemented with just three successive operations of twisting (T1, T2, T3), particularly for cost reasons.

Figure 4:
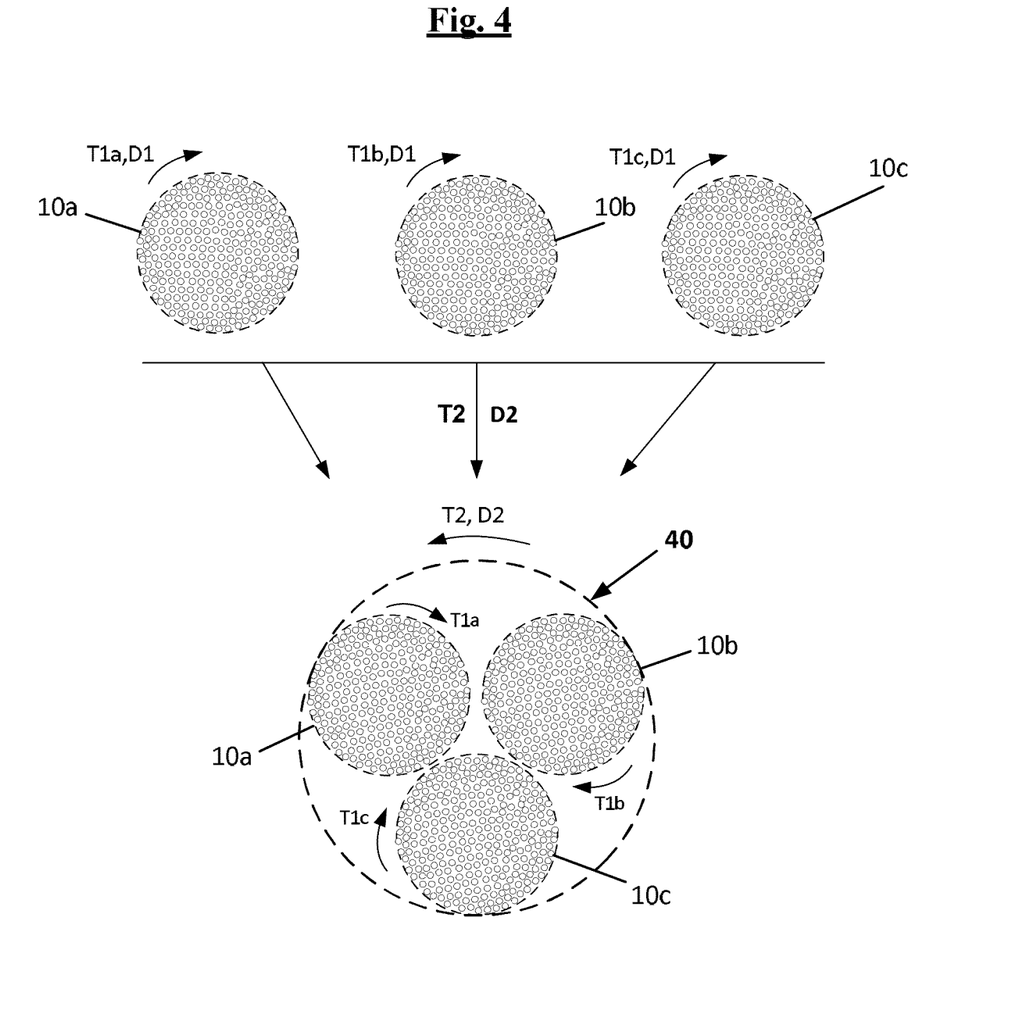

FIG. 4, in comparison with FIG. 3, illustrates a conventional way of preparing double twist textile cords. M pre-strands (for example here three strands, 10a, 10b, 10c)—in fact directly acting as strands—are twisted together, in a (second) direction D2 which is opposite to the (first) direction of twisting D1, to form directly a double twist (T1, T2) textile cord (40) according to the prior art.

Figure 5:
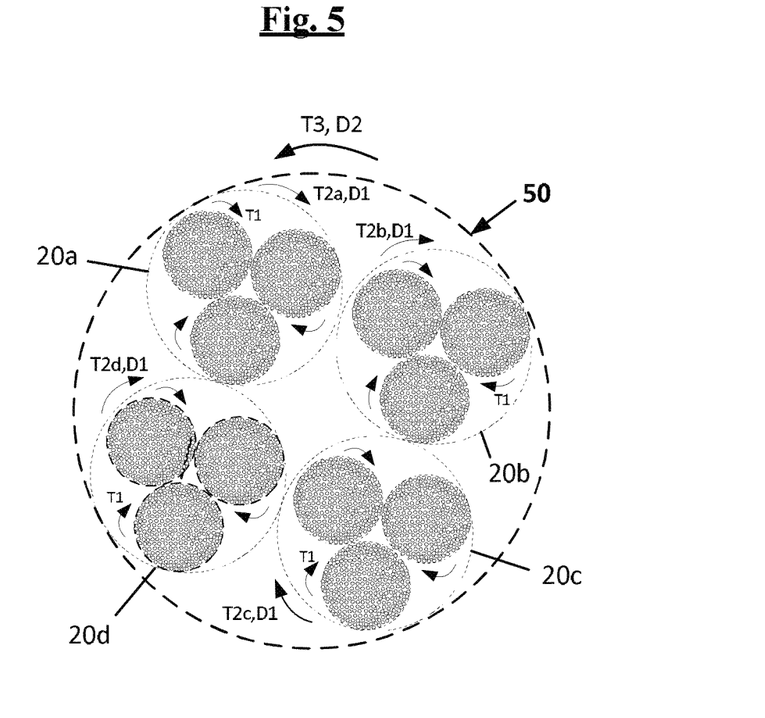

FIG. 5 schematically depicts, in cross section, the assembly of 4 strands (20a, 20b, 20c, 20d) (twisted beforehand with T2a, T2b, T2c, T2d in the same direction D1) which are assembled by a third operation of twisting T3 in the direction D2 which is opposite to the direction D1, to form another example of final cord (50) with triple twist (T1, T2, T3) according to the invention. Each strand is characterized by a specific second twist T2 (in this instance T2a, T2b, T2c, T2d) which may be the same or different from one strand to another.

Figure 6:
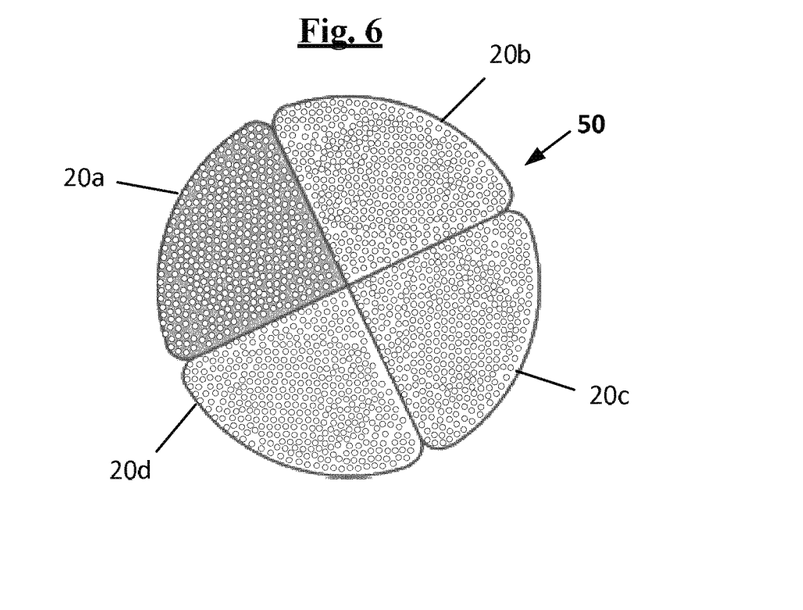

As a reminder, FIG. 6 depicts, still in cross section, another depiction of the previous cord (50), less schematic than the preceding depiction, recalling the well-known fact that the cross section of a textile cord, incidentally whether or not it be one in accordance with the invention, once formed and under minimal tension, is in fact closer to a cylindrical structure with a cross section of essentially circular outline, because of the high degree of lateral radial plasticity of the strands (20a, 20b, 20c, 20d) and pre-strands (10a, 10b, 10c) afforded by the multifilamentary nature of the starting fibres (yarns).

In the present application, what is meant very generally by "textile" or "textile material" is any material made of a substance other than a metal, whether it be a natural substance or a synthetic substance, that can be converted into a thread, fibre or film by any suitable conversion method. Mention may be made, by way of nonlimiting example, of a polymer spinning method such as, for example, melt spinning, wet spinning or gel spinning.

Although materials made of a non-polymer material (for example a mineral substance such as glass or a non-polymer organic material such as carbon) are included in the definition of a textile material, the invention is preferably implemented using materials made of polymer material, either of the thermoplastic or of the non-thermoplastic type.

Notable examples of high modulus textile yarns (which by definition here have a modulus Mi greater than 2000 cN/tex) include high modulus cellulose fibres "Lyocell" marketed by the company Hyosung, high-modulus cellulose fibres made of cellulose formiate or of regenerated cellulose, such as described in applications WO 85/05115 or WO 97/06294, fibres made of polyvinyl alcohol (abbreviated to PVA), aramid fibres (which are made of an aromatic polyamide), aromatic polyester fibres, fibres made of polybenzazole (PBO for short), high density polyethylene (HDPE) fibres such as the "Dyneema" fibres marketed by the company DSM.

According to one particularly preferred embodiment, the high modulus yarns of the textile cord of the invention are aramid yarns. What is meant by "aramid", as is well known, is a polymer made up of linear macromolecules formed of aromatic groups connected to one another by amide bonds of which at least 85% are connected directly to two aromatic cores, and more particularly of poly(p-phenylene terephthalamide) (or PPTA) fibres which have long been manufactured from optically anisotropic spinning compositions. By way of example of such aramid yarns, mention may for example be made of the fibres marketed by the DuPont company under the name of "Kevlar" and by the Teijin company under the names of "Twaron" or "Technora".

Of course, the invention applies to instances in which the textile cord of the invention is formed of several yarns of different materials to constitute a hybrid or composite cord, for example of which at least one (which means to say one or several) yarn does not have a modulus Mi greater than 2000 cN/tex, of course at least half of the N times M yarns having a modulus Mi greater than 2000 cN/tex. By way of particular examples of such hybrid cords mention may notably be made of those based on yarns of at least aramid and nylon, aramid and polyester (for example PET or PEN), aramid and cellulose or aramid and polyketone.

In the cord of the invention, N preferably varies in a range from 2 to 6, more preferably from 2 to 4. According to another preferred embodiment, M varies in a range from to 2 to 6, more preferably from 2 to 4. According to another preferred embodiment, the total number of yarns (equal to N times M) is comprised in a range from 4 to 25, more preferably from 4 to 16.

In a way well known to those skilled in the art, the twists may be measured and expressed in two different ways, namely, and in a simple way, as number of turns per metre (t/m) or, and more rigorously when wishing to compare materials of different natures (cubic densities) and/or different yarn counts, in terms of the twist angle of the filaments or, which is equivalent, in the form of a twist factor K.

The twist factor K is connected to the twist T (here, for example, to T1, T2 and T3 respectively) by the known relationship as follows:

$$K = (\text{twist } T) \times [(\text{yarn count}/(1000 \cdot \rho))]^{1/2}$$

in which the twist T of the elementary filaments (that make up the pre-strand, strand or plied yarn) is expressed in turns per metre, the yarn count is expressed in tex (weight in grams of 1000 metres of pre-strand, strand or plied yarn) and finally $\rho$ is the density or cubic density (in $g/cm^3$) of the material of which the pre-strand, strand or plied yarn is made (for example, around 1.50 $g/cm^3$ for cellulose, 1.44 $g/cm^3$ for aramid, 1.38 $g/cm^3$ for a polyester such as PET, 1.14 $g/cm^3$ for nylon); in the case of a hybrid cord, $\rho$ is of course an average of the densities weighted by the respective yarn counts of the materials that make up the pre-strands, strands or plied yarns.

In the cord of the invention, for preference, the twist T1 expressed in turns per metre (t/m) is comprised between 10 and 350, more preferably between 20 and 200. According to another preferred embodiment, each pre-strand has a twist coefficient K1 which is comprised between 2 and 80, more preferably between 6 and 70.

According to another preferred embodiment, the twist T2 expressed in turns per metre is preferably comprised between 25 and 470, more preferably between 35 and 400. According to another preferred embodiment, each strand has a twist coefficient K2 which is comprised between 10 and 150, more preferably between 20 and 130.

According to another preferred embodiment, the twist T3 expressed in turns per metre is preferably comprised between 30 and 600, more preferably between 80 and 500. According to another preferred embodiment, the cord of the invention has a twist coefficient K3 which is comprised between 50 and 500, more preferably between 80 and 230.

For preference, T2 is greater than T1 (T1 and T2 notably being expressed in t/m). According to another preferred embodiment, which may or may not be combined with the previous one, T2 is less than T3 (T2 and T3 being notably expressed in t/m), T2 being more preferably comprised between 0.2 and 0.95 times T3, in particular between 0.4 and 0.8 times T3.

According to another preferred embodiment, the sum T1+T2 is comprised between 0.8 and 1.2 times T3, more preferably between 0.9 and 1.1 times T3 (T1, T2 and T3 being notably expressed in t/m), T1+T2 in particular being equal to T3.

In the cord of the invention, for preference the majority (by number), more preferably all of the N times M yarns (in the initial state, namely without the twist T1) have a modulus Mi which is greater than 2000 cN/tex, more preferably greater than 2500 cN/tex. The initial elastic modulus Mi, or Young's modulus, is of course the longitudinal elastic modulus, namely the one along the axis of the yarn.

More preferably still, at least half, particularly most (by number) of the N times M yarns have a modulus Mi greater than 3000 cN/tex, more particularly greater than 3500 cN/tex. More preferably still, it is all of the N times M yarns that have a modulus Mi greater than 3000 cN/tex, more particularly greater than 3500 cN/tex.

All the properties (yarn count, initial modulus of the yarns, breaking strength and tenacity) indicated hereinabove are determined at 20° C. on bare (which means to say uncoated) cords or on coated cords (which means to say cords that are ready for use or have been extracted from the item that they reinforce) which have been subjected to a prior conditioning; what is meant by "prior conditioning" is that the cords (after drying) are stored for at least 24 hours, prior to measurement, in a standard atmosphere in accordance with European Standard DIN EN 20139 (temperature of 20±2° C.; relative humidity of 65±2%).

The yarn count (or linear density) of the pre-strands, strands or cords is determined on at least three specimens, each corresponding to a length of at least 5 m by weighing of this length; the yarn count is given in tex (weight in grams of 1000 m of product—remember: 0.111 tex is equal to 1 denier).

The tensile mechanical properties (tenacity, initial modulus, elongation at break) are measured in a known way using an INSTRON tensile test machine fitted with capstan grips of the "4D" type (for breaking strengths of below 100 daN) or "4E" type (for breaking strengths at least equal to 100 daN), unless indicated otherwise according to Standard ASTM D885 (2010). The tested specimens are subjected to traction over an initial length of 400 mm in the case of the 4D grips and 800 mm in the case of the 4E grips, at a nominal rate of 200 mm/min, under a standard pretension of 0.5 cN/tex. All the results given are a mean over 10 measurements. When the properties are measured on yarns, these, in the well-known way, undergo a very light prior twist referred to as "protective twist", corresponding to a twist angle of about 6 degrees, before they are positioned and tensioned in the grips.

The tenacity (breaking strength divided by yarn count) and initial elastic modulus (or Young's modulus) are given in cN/tex or centinewton per tex (remember: 1 cN/tex is equal to 0.111 g/den (gram per denier)). The initial modulus is represented by the tangent at the origin of the force-elongation curve, described as the gradient of the linear part of the force-elongation curve that occurs just after a standard pretension of 0.5 cN/tex. The elongation at break is indicated as a percentage.

5. EXEMPLARY EMBODIMENTS OF THE INVENTION

The textile cord of the invention can advantageously be used to reinforce tyres of all types of vehicles, particularly motor bikes, passenger vehicles, or industrial vehicles such as heavy duty vehicles, construction plant vehicles, aircraft, other transport or handling vehicles.

Figure 7:
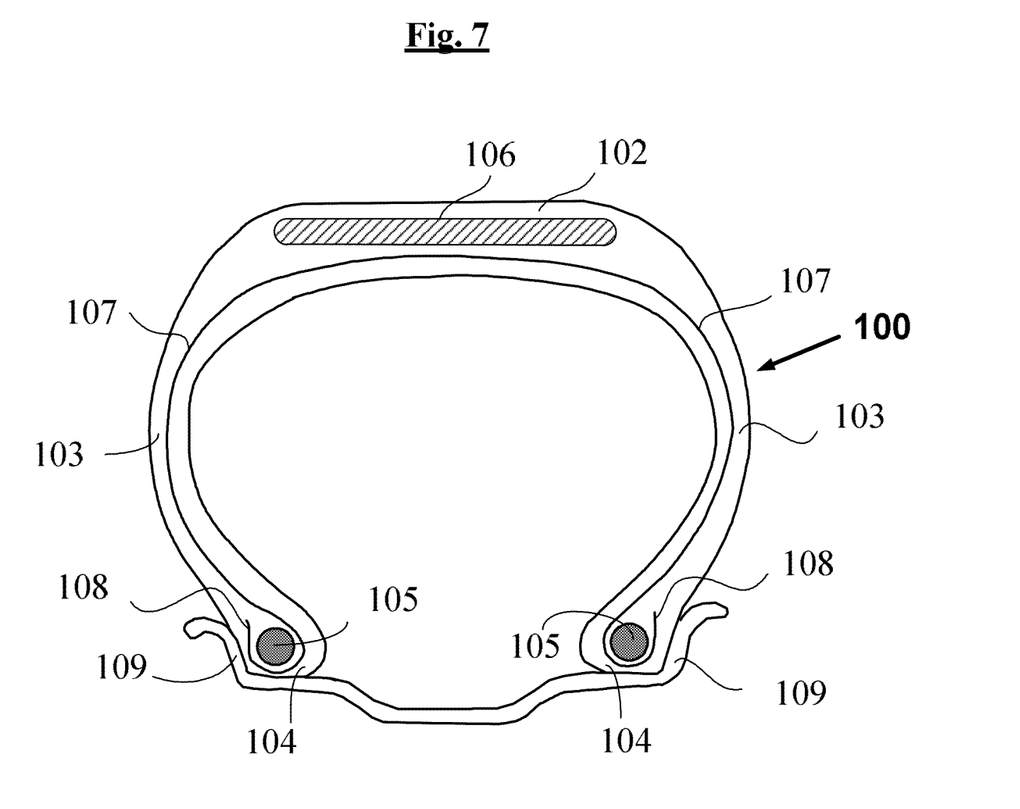

By way of example, FIG. 7 very schematically (and not to scale) depicts a radial cross section through a tyre according to the invention, for example for a vehicle of the passenger vehicle type.

This tyre 100 comprises a crown 102 reinforced by a crown reinforcement or belt 106, two sidewalls 103, and two beads 104, each of these beads being reinforced with a bead wire 105. The crown 102 is surmounted by a tread, not depicted in this schematic figure. A carcass reinforcement 107 is wrapped around the two bead wires in each bead, the turnup 108 of this reinforcement 107 for example being positioned towards the outside of the tyre 100 which here is depicted mounted on its rim 109.

In a way known per se the carcass reinforcement 107 is made up of at least one rubber ply reinforced with what are known as "radial" textile cords, which means to say that these cords are arranged practically parallel to one another and extend from one bead to the other in such a way as to form an angle comprised between 80° and 90° with the circumferential mid plane (plane perpendicular to the axis of rotation of the tyre which is situated midway between the two beads 104 and passes through the middle of the crown reinforcement 106).

The belt 106 is made up for example, in a way known per se, of at least two rubber plies referred to as "working plies" or "triangulation plies" which are superposed and crossed, reinforced with metal cords arranged substantially parallel to one another and inclined with respect to the circumferential mid plane, it being possible for these working plies to be associated or not with other rubber plies and/or fabrics. These working plies have the prime function of giving the tyre casing high cornering stiffness. The belt 106 further comprises in this example a rubber ply referred to as a "hooping ply" which is reinforced with reinforcing threads referred to as "circumferential" which means to say that these reinforcing threads are arranged practically parallel to one another and run substantially circumferentially around the tyre casing so as to form an angle preferably comprised in a range from 0 to 10° with the circumferential mid plane. These circumferential reinforcing threads have the prime function, it will be recalled, of resisting crown spin-out at high speed.

This tyre 100 of the invention has, for example, the essential feature that at least the hooping ply of its belt (106) and/or its carcass reinforcement (107) comprises a textile cord according to the invention. According to another possible exemplary embodiment of the invention, it is for example the bead wires (105) which may be made, in full or in part, of a textile cord according to the invention.

The rubber compositions used for these plies are compositions that are conventional for the skimming of textile reinforcers, typically based on natural rubber or some other diene elastomer, on a reinforcing filler such as carbon black, on a vulcanizing system and the usual additives. Adhesion between the composite textile cord of the invention and the layer of rubber with which it is coated is afforded for example by a usual adhesive composition, for example an adhesive of RFL type or equivalent adhesive.

5.1. Tensile Testing

Because of its specific construction, the textile cord of the invention has notably improved tensile test properties, as demonstrated by the following exemplary embodiments.

Five different tensile tests (Tests No. 1 to No. 5) were conducted with the manufacture, in total, of 11 textile cords of different constructions, in accordance or not in accordance with the invention, based either on nylon yarns or on high modulus Mi yarns (in these examples, aramid yarns).

The nature of each example of cord ("T" for the control, "C" for comparative and "I" for those in accordance with the invention), the material used ("N" for nylon, "A" for aramid), its construction and final properties are summarized in the attached table 1.

The starting yarns are of course commercially available, for example in the case of nylon sold by the company Kordsa under the name "T728" or by the company PHP under the names "Enka 140HRT" or "Enka 444HRST", in the case of aramid by the DuPont company under the name of "Kevlar" or by the Teijin company under the name of "Twaron".

As already indicated, the tenacity is the force at break with respect to the yarn count and is expressed in cN/tex. Also indicated is the apparent tenacity (in daN/mm²), and in this case the force at break is related to the apparent diameter denoted Ø which is measured in accordance with the method as follows.

Use is made of an apparatus which, using a receiver made up of an optical collector system, of a photodiode and of an amplifier, makes it possible to measure the shadow of a thread illuminated by a laser beam of parallel light with a precision of 0.1 micrometre. Such an apparatus is marketed for example by the company Z-Mike under the reference "1210". The method involves fixing to a motorized mobile table, under a standard preload of 0.5 cN/tex, a specimen of the thread that is to be measured, which has undergone conditioning beforehand. Secured to the mobile table, the thread is moved perpendicular to the cast-shadow measurement system at a speed of 25 mm/s and intersects the laser beam orthogonally. At least 200 cast-shadow measurements are taken over a 420 mm length of thread; the mean of these cast-shadow measurements represents the apparent diameter Ø.

For each test, the breaking force, tenacity and apparent tenacity have also been indicated in terms of relative values, base 100 being used for the control cord in each of the five tests.

The control cords (denoted "T" in table 1) are all characterized by a conventional double twist T1, T2 construction; the other cords (comparative not in accordance with the invention, or in accordance with the invention) are all characterized by an unconventional triple twist T1, T2, T3 construction. Only the cords C8, C9 and C11 are cords according to the invention and combine the triple twist feature with the fact of being made up of high modulus yarns (in these examples, aramid yarns).

To make this table 1 easier to read, it will be noted here that, for example, the construction denoted "N47/-/3/4" for control cord C1 means that this cord is a double twist (T1, T2) cord which is derived simply from an operation of twisting (T2, D2 or S) 4 different strands which have each been prepared beforehand by an operation of individually twisting 3 nylon (N) yarns with a yarn count of 47 tex in the opposite direction (T1, D1 or Z).

The construction denoted "N47/1/3/4" for the cord C2 means that this cord is a triple twist (T1, T2, T3) cord which is derived from an operation of final twisting (T3, D2 or S) of 4 different strands which have each been prepared beforehand by an operation of intermediate twisting (T2) of 3 pre-strands in the opposite direction (D1 or Z), each of these 3 pre-strands consisting of a single nylon (N) yarn of yarn count 47 tex which has been twisted on itself beforehand during a first operation of twisting T1 in the same direction (D1 or Z) as for the pre-strands.

The 5 examples of control cords ("T") C1, C3, C5, C7 and C10 are all characterized by a double twist construction; they have been manufactured by assembling 2, 3 or 4 strands with a (second) final twist (T2) that varies as the case may be from 150 to 300 t/m, corresponding to a twist coefficient K2 varying from 175 to 215 and a direction D2 (S direction). In the conventional way, each of these strands had been manufactured beforehand with a (first) initial twisting (denoted T1) from 150 to 300 t/m, as the case may be, of a yarn on itself in the opposite direction D1 (Z direction).

The 3 examples of cords according to the invention C8, C9 and C11 (also denoted "I" and in bold in table 1) are characterized by a triple twist T1, T2, T3 construction (in these examples, Z/Z/S); they were manufactured by assembling 3 or 4 strands with a final twist (denoted T3) of 150 or 300 t/m (K3 of 203 or 215) and a direction D2 (S direction). According to the invention, each of these strands had been manufactured beforehand by assembly of 3 pre-strands with a twist T2 (110, 180 or 240 t/m) and an opposite direction D1 (Z direction), each of these pre-strands having itself been prepared beforehand by a twisting T1 (respectively 40, 120 or 60 t/m) of a yarn on itself in the direction D1 (Z direction).

As for the 3 comparative examples (denoted "C" in table 1) of cords not in accordance with the invention, C2, C4 and C6, these are all characterized by a triple twist T1, T2, T3 construction. Unlike the cords according to the invention, the yarns that make up these cords were all nylon yarns rather than high modulus yarns.

It is important to note that all the textile cords in these examples are characterized, whatever the material (nylon or aramid) and yarn count (47, 94, 140, 55 or 330 tex) of their starting yarns, by final twist coefficients (K2 or K3 respectively depending on whether the cord has a double twist T1, T2 or triple twist T1, T2, T3 construction) which are very similar, with a mean value equal to approximately 195 (varying from 175 to 215).

From studying this table 1 in detail it is first of all noted, for tests 1 to 3, all conducted with nylon yarns (Mi of 440 cN/tex approximately), that switching from the double twist (C1, C3 and C5) to the triple twist (C2, C4 and C6) is not accompanied by any appreciable change to the breaking strength or to the other properties (Ø, yarn count, tenacity).

By contrast, for tests 4 and 5, conducted with high modulus yarns (aramid yarns), more specifically with 55 tex or 330 tex "Kevlar" yarns (Mi of around 4000 cN/tex) it is possible to see that switching from the double twist construction (C7 and C10 respectively) to the triple twist construction (respectively C8 and C9 on the one hand and C11 on the other), is unexpectedly accompanied, with all other parameters remaining unchanged, by:
  an improvement from 6% (cord C9) to 16% (cord C11) in the breaking strength and from 8% (cord C9) to 17% (cord C11) in the tenacity, something which is very significant to a person skilled in the art;
  combined with an appreciable reduction in the apparent diameter Ø and yarn count, these being clear indicators of better compactness of the cords according to the invention and ultimately of the quality of these reinforcers, because of their highly specific construction;
  all of this ultimately resulting in an increase varying from 12% (cord C9) to 26% (cord C11) in the apparent tenacity.

In summary, the invention therefore makes it possible, for the same given final twist, to improve the properties of compactness, breaking strength and tenacity of the high modulus textile cords such as aramid cords. Furthermore, and just as surprisingly, their novel construction gives them compression or bending-compression endurance which likewise is notably improved, as the following endurance test results indicate.

5.2. Compression Endurance (Disc Fatigue Test) or Bending-Compression (Shoe Shine Test) Tests For textile cords intended in particular to reinforce the structures of tyres, the fatigue strength can be analysed by subjecting these cords to various known laboratory tests, and notably to the fatigue test known by the name of "belt" test, sometimes known as the "shoe shine test", or alternatively to the fatigue test known as the "disc fatigue test" (see for example EP 848 767, U.S. Pat. Nos. 2,595,069, 4,902,774, standard ASTM D885-591 revised 67T), in which tests the previously coated textile cords are incorporated into a rubber item that is vulcanized.

The principle behind the "belt" test first of all is as follows: the belt comprises two layers of the cord that is to be tested, in a known rubber mixture of the type commonly used for reinforcing tyres. The axis of each cord is oriented in the longitudinal direction of the belt and the cords are separated from the faces of the belt by a thickness of rubber measuring approximately 1 mm.

This belt is then subjected to the following loadings: the belt is driven cyclically, using a rod-crank system, around a disc of given diameter, so that each elementary portion of the belt is subjected to a tension of 15 daN and undergoes cycles of variation in curvature which cause it to flex from an infinite radius of curvature to a given radius of curvature and do so for 190 000 cycles at a frequency of 7 Hz. This variation in curvature of the belt causes the cord of the interior layer, the one closest to the wheel, to experience a given geometric compression ratio dependent on the chosen wheel diameter. At the end of these stress loadings, the cords are stripped from the interior layer and the residual breaking strength of the fatigue-loaded cords is measured.

The "disc fatigue test" is another test well known to those skilled in the art. It essentially consists in incorporating the cords that are to be tested into blocks of rubber and then, after curing, in fatiguing the test specimens of rubber thus formed in compression between two rotary discs for a very high number of cycles (in the examples which follow, 600 000 cycles at 33 cycles/s). After fatigue loading, the cords are extracted from the test specimens and their residual breaking strength measured.

First of all, the cords C1 to C4 and C7 not in accordance with the invention and the cords C8 and C9 according to the invention from the preceding tests were subjected on the one hand to the "disc fatigue test" with a maximum geometric compression ratio of the test specimen of around 16% (angle of 3° between the two discs) and, on the other hand, to the "shoe shine test" with a geometric compression ratio of the cord of the interior layer of around 12% (20 mm wheel).

In both instances, the residual breaking strengths (Fr) were measured on the cords extracted after fatigue loading, these being indicated in terms of relative values in the attached table 2. For both fatigue loading conditions, the base 100 was adopted for the residual breaking strength (Fr) measured on the double twist T1, T2 control ("T") cords. A value higher than 100 indicates a residual breaking strength which is higher, and therefore an endurance that is improved by comparison with the corresponding control.

From studying this table 2 in detail it is noted first of all that, for the tests 1 and 2 conducted with nylon yarns, the switch from double twist (C1 and C3 respectively) to triple twist (C2 and C4 respectively), regardless of the type of test (disc fatigue test or shoe shine test), is not accompanied by any change that is appreciable bearing in mind the usual precision of this type of test, and in any case not by any improvement, in the compression or bending-compression endurance.

By contrast, for test 4, conducted with high modulus yarns, it is found surprisingly that the switch from the double twist construction (cord C7) to the triple twist construction (cords C8 and C9) is accompanied, all other parameters remaining the same, unexpectedly by a quite remarkable improvement (varying from 20% to 62% depending on the case) in the residual breaking strength, for each of the two fatigue tests.

It is noted in particular that, in the case of the cord C9 according to the invention, in which T2 is comprised between 0.4 and 0.8 times (in this particular instance 0.6 times) T3, the endurance is even further improved in comparison with the cord C8 according to the invention for which T2 does not satisfy this relationship.

The tests mentioned above were supplemented by an additional endurance test (test 6 in table 2) conducted on two more textile cords C12 (control) and C13 (invention) based on high modulus yarns as for the preceding test 4, both having a final twist coefficient (K2 or K3 respectively) that was the same (equal to approximately 180) as those adopted for the nylon controls in the previous tests 1 to 3.

In a way similar to the constructions commented upon hereinabove, the construction denoted "A55/-/3/3" for control cord C12 means that this cord is a double twist (T1, T2) cord derived simply from an operation of twisting (T2 of 310 t/m, D2 or S) of 3 different strands each of which was prepared previously by an operation of individual twisting (T1 of 310 t/m, D1 or Z) of 3 aramid (A) yarns of 55 tex yarn count in the opposite direction.

Comparatively, for the construction denoted "A55/1/3/3" of the cord C13 according to the invention, the textile cord concerned is a triple twist (T1, T2, T3) cord derived from an operation of final twisting (T3 of 310 t/m, D2 or S) of 3 different strands which have each been prepared beforehand by an operation of intermediate twisting (T2 of 185 t/m) in the opposite direction (D1 or Z) of 3 pre-strands, each of the pre-strands consisting of 1 single aramid (A) yarn of 55 tex yarn count which was twisted on itself beforehand during a first operation of twisting T1 (125 t/m) in the same direction D1 (Z).

The results obtained have been added to table 2. They clearly confirm the superiority of the cord C13 of the invention with triple twist, as compared with the double twist control cord C12 with a quite remarkable increase in the residual breaking strength, for each of the two fatigue tests, and an increase of particular significance in the belt test.

In conclusion, by virtue of the invention it is now possible, for the same given final twist, to improve not only the properties of compactness, breaking strength and tenacity of aramid textile cords but also their compression or bending-compression endurance, and thus further optimize the architecture of the tyres that these cords are liable to reinforce.

TABLE 1

| Test No | Cord ref. | Cord type | Cord construction | Twist t/m — T1 | Twist t/m T1 T2 | Twist t/m T2 T3 | Twist coefficient — K1 | Twist coefficient K1 K2 | Twist coefficient K2 K3 | Breaking strength daN | Ø apparent mm | Yarn count tex | Yarn Tenacity cN/tex | | Apparent tenacity daN/mm² | |
|---|---|---|---|---|---|---|---|---|---|---|---|---|---|---|---|---|
| 1 | C1 | T | N47/—/3/4 | 0 | 250Z | 250S | 0 | 88 | 176 | 35.3 | 100 | 1.05 | 638 | 55 100 | 41 | 100 |
|  | C2 | C | N47/1/3/4 | 100Z | 150Z | 250S | 20 | 53 | 176 | 34.1 | 97 | 1.02 | 642 | 53 96 | 42 | 102 |
| 2 | C3 | T | N94/—/2/3 | 0 | 260Z | 260S | 0 | 106 | 183 | 41.2 | 100 | 1.03 | 636 | 65 100 | 50 | 100 |
|  | C4 | C | N94/1/2/3 | 100Z | 160Z | 260S | 29 | 65 | 183 | 42.3 | 103 | 1.04 | 640 | 66 102 | 50 | 100 |
| 3 | C5 | T | N140/—/2/2 | 0 | 250Z | 250S | 0 | 124 | 175 | 44.5 | 100 | 1.02 | 613 | 73 100 | 54 | 100 |
|  | C6 | C | N140/1/2/2 | 100Z | 150Z | 250S | 35 | 74 | 175 | 43.5 | 98 | 1.03 | 608 | 72 99 | 52 | 96 |
| 4 | C7 | T | A55/—/3/4 | 0 | 300Z | 300S | 0 | 102 | 203 | 110.6 | 100 | 1.07 | 777 | 142 100 | 122 | 100 |
|  | C8 | I | A55/1/3/4 | 60Z | 240Z | 300S | 12 | 81 | 203 | 119.4 | 108 | 1.03 | 764 | 156 110 | 143 | 117 |
|  | C9 | I | A55/1/3/4 | 120Z | 180Z | 300S | 23 | 61 | 203 | 116.9 | 106 | 1.04 | 765 | 153 108 | 137 | 112 |
| 5 | C10 | T | A330/—/3/3 | 0 | 150Z | 150S | 0 | 124 | 215 | 404.2 | 100 | 2.48 | 3482 | 116 100 | 84 | 100 |
|  | C11 | I | A330/1/3/3 | 40Z | 110Z | 150S | 19 | 91 | 215 | 467.8 | 116 | 2.37 | 3428 | 136 117 | 106 | 126 |

TABLE 2

| Test No. | Cord ref. | Cord type | Cord construction | Twist t/m — T1 | Twist t/m T1 T2 | Twist t/m T2 T3 | Twist coefficient — K1 | Twist coefficient K1 K2 | Twist coefficient K2 K3 | "Disc Fatigue Test" Fr residual | "Shoe Shine Test" Fr residual |
|---|---|---|---|---|---|---|---|---|---|---|---|
| 1 | C1 | T | N47/—/3/4 | 0 | 250Z | 250S | 0 | 88 | 176 | 100 | 100 |
|  | C2 | C | N47/1/3/4 | 100Z | 150Z | 250S | 20 | 53 | 176 | 95 | 97 |
| 2 | C3 | T | N94/—/2/3 | 0 | 260Z | 260S | 0 | 106 | 183 | 100 | 100 |
|  | C4 | C | N94/1/2/3 | 100Z | 160Z | 260S | 29 | 65 | 183 | 97 | 99 |
| 4 | C7 | T | A55/—/3/4 | 0 | 300Z | 300S | 0 | 102 | 203 | 100 | 100 |
|  | C8 | I | A55/1/3/4 | 60Z | 240Z | 300S | 12 | 81 | 203 | 120 | 136 |
|  | C9 | I | A55/1/3/4 | 120Z | 180Z | 300S | 23 | 61 | 203 | 125 | 162 |
| 6 | C12 | T | A55/—/3/3 | 0 | 310Z | 310S | 0 | 105 | 182 | 100 | 100 |
|  | C13 | I | A55/1/3/3 | 125Z | 185Z | 310S | 24 | 63 | 182 | 111 | 193 |

The invention claimed is:

1. A tire reinforced with a textile cord with at least triple twist, the textile cord comprising:
   at least N strands, N being greater than 1, twisted together with a twist (T3) and a direction (D2),
   wherein each strand is made up of M pre-strands, M being greater than 1, themselves twisted together with a twist (T2) and a direction (D1) opposite to the direction (D2),
   wherein each pre-strand consists of a yarn which has been twisted on itself with a twist (T1) and the direction (D1) opposite to the direction (D2),
   wherein the sum of the twist (T1) measured in turns per meter and of the twist (T2) measured in turns per meter is between 0.8 and 1.2 times the twist (T3) measured in turns per meter,
   wherein the twist (T2) measured in turns per meter comprises between 0.4 and 0.8 times the twist (T3) measured in turns per meter,
   wherein N strands multiplied by M pre-strands equals a total number of yarns,
   wherein at least half of the yarns have an initial elastic modulus denoted Mi which is greater than 2000 cN/tex, and
   wherein each yarn is made of a polymer material.

2. The tire according to claim 1, wherein N varies in a range from 2 to 6.

3. The tire according to claim 2, wherein N varies in a range from 2 to 4.

4. The tire according to claim 1, wherein M varies in a range from 2 to 6.

5. The tire according to claim 4, wherein M varies in a range from 2 to 4.

6. The tire according to claim 1, wherein the total number of yarns is in a range from 4 to 25.

7. The tire according to claim 6, wherein the total number of yarns is in a range from 4 to 16.

8. The tire according to claim 1, wherein the twist (T1), expressed in turns per meter, is between 10 and 350 turns per meter.

9. The tire according to claim 8, wherein the twist (T1) is between 20 and 200 turns per meter.

10. The tire according to claim 1, wherein each pre-strand has a twist coefficient (K1) which is between 2 and 80.

11. The tire according to claim 10, wherein the twist coefficient (K1) of each pre-strand is between 6 and 70.

12. The tire according to claim 1, wherein the twist (T2), expressed in turns per meter, is between 25 and 470 turns per meter.

13. The tire according to claim 12, wherein the twist (T2) is between 35 and 400 turns per meter.

14. The tire according to claim 1, wherein each strand has a twist coefficient (K2) which is between 10 and 150.

15. The tire according to claim 14, wherein the twist coefficient (K2) of each strand is between 20 and 130.

16. The tire according to claim 1, wherein the twist (T3), expressed in turns per meter, is between 30 and 600 turns per meter.

17. The tire according to claim 16, wherein the twist (T3) is between 80 and 500 turns per meter.

18. The tire according to claim 1, wherein the cord has a twist coefficient (K3) which is between 50 and 500.

19. The tire according to claim 18, wherein the twist coefficient (K3) of the cord is between 80 and 230.

20. The tire according to claim 1, wherein the twist (T2) measured in turns per meter is greater than the twist (T1) measured in turns per meter.

21. The tire according to claim 1, wherein the twist (T3) measured in turns per meter is greater than the twist (T2) measured in turns per meter.

22. The tire according to claim 1, wherein the sum of the twist (T1) measured in turns per meter and of the twist (T2) measured in turns per meter is between 0.9 and 1.1 times the twist (T3) measured in turns per meter.

23. The tire according to claim 1, wherein the sum of the twist (T1) measured in turns per meter and of the twist (T2) measured in turns per meter is equal to the twist (T3) measured in turns per meter.

24. The tire according to claim 1, wherein all of the yarns have a modulus Mi greater than 2000 cN/tex.

25. The tire according to claim 24, wherein all of the yarns have a modulus Mi greater than 2500 cN/tex.

26. The tire according to claim 1, wherein at least half of the yarns have a modulus Mi greater than 3000 cN/tex.

27. The tire according to claim 1, wherein each yarn is made of one or several materials selected from the group consisting of celluloses, polyvinyl alcohols, polyketones, aromatic polyamides, aromatic polyesters, polybenzazoles, polyimides, and polyesters.

28. The tire according to claim 27, wherein each yarn is made of aromatic polyamides.

29. A method of reinforcing a tire comprising a step of including a textile cord with at least triple twist in the tire, the textile cord comprising:
    at least N strands, N being greater than 1, twisted together with a twist (T3) and a direction (D2),
    wherein each strand is made up of M pre-strands, M being greater than 1, themselves twisted together with a twist (T2) and a direction (D1) opposite to the direction (D2),
    wherein each pre-strand consists of a yarn which has been twisted on itself with a twist (T1) and the direction (D1) opposite to the direction (D2),
    wherein the sum of the twist (T1) measured in turns per meter and of the twist (T2) measured in turns per meter is between 0.8 and 1.2 times the twist (T3) measured in turns per meter,
    wherein the twist (T2) measured in turns per meter comprises between 0.4 and 0.8 times the twist (T3) measured in turns per meter,
    wherein N strands multiplied by M pre-strands equals a total number of yarns,
    wherein at least half of the yarns have an initial elastic modulus denoted Mi which is greater than 2000 cN/tex, and
    wherein each yarn is made of a polymer material.

* * * * *